US011643569B2

United States Patent
Drumright et al.

(10) Patent No.: US 11,643,569 B2
(45) Date of Patent: May 9, 2023

(54) METHOD FOR PROVIDING SUBSTRATE COATED WITH A CURED DAMPING COATING AND COATED SUBSTRATE SO PROVIDED

(71) Applicants: Dow Global Technologies LLC, Midland, MI (US); Rohm and Haas Company, Collegeville, PA (US)

(72) Inventors: Ray E. Drumright, Midland, MI (US); Zhenwen Fu, Norristown, PA (US); Justin Gimbal, Warminster, PA (US); Craig F. Gorin, Midland, MI (US); Xin Jin, Berwyn, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 368 days.

(21) Appl. No.: 17/045,863

(22) PCT Filed: Apr. 26, 2019

(86) PCT No.: PCT/US2019/029257
§ 371 (c)(1),
(2) Date: Oct. 7, 2020

(87) PCT Pub. No.: WO2019/212879
PCT Pub. Date: Nov. 7, 2019

(65) Prior Publication Data
US 2021/0155823 A1 May 27, 2021

Related U.S. Application Data

(60) Provisional application No. 62/666,259, filed on May 3, 2018.

(51) Int. Cl.
*C09D 135/02* (2006.01)
*C08K 3/26* (2006.01)

(52) U.S. Cl.
CPC .............. *C09D 135/02* (2013.01); *C08K 3/26* (2013.01); *C08K 2003/265* (2013.01)

(58) Field of Classification Search
CPC ................ C09D 135/02; C08K 2003/265
USPC ........................................ 524/425
See application file for complete search history.

(56) References Cited

U.S. PATENT DOCUMENTS

| | | | |
|---|---|---|---|
| 6,153,709 A | 11/2000 | Xiao et al. | |
| 7,893,149 B2 | 2/2011 | Hermes et al. | |
| 7,893,151 B2 | 2/2011 | Johnson et al. | |
| 7,919,540 B2 | 4/2011 | Heuts et al. | |
| 8,389,630 B2 | 3/2013 | Tamai et al. | |
| 2003/0165701 A1* | 9/2003 | Straw ................ | C09D 201/00 428/500 |
| 2005/0081994 A1 | 4/2005 | Beckley | |
| 2009/0048357 A1 | 2/2009 | Yasui et al. | |
| 2010/0227949 A1 | 9/2010 | Tamai et al. | |
| 2013/0296485 A1* | 11/2013 | Hsueh ................ | C09D 167/06 524/592 |
| 2014/0343182 A1 | 11/2014 | Jin et al. | |
| 2015/0218431 A1 | 8/2015 | Jin et al. | |
| 2016/0168411 A1 | 6/2016 | Wang et al. | |

FOREIGN PATENT DOCUMENTS

| | | |
|---|---|---|
| EP | 1023413 | 8/2000 |
| EP | 1741741 A2 | 1/2007 |
| WO | 9916840 | 4/1999 |
| WO | 2017095658 A1 | 6/2017 |

OTHER PUBLICATIONS

Chinese Office Action for the corresponding Chinese Application No. 201980026440.5; English translation of the office action; 4 pages.
International Search Report for the corresponding International Application No. PCT/US2019/029257; dated Aug. 20, 2019; 2 pages.

* cited by examiner

*Primary Examiner* — Hui H Chin
(74) *Attorney, Agent, or Firm* — Karl E. Stauss; Cantor Colburn LLP

(57) ABSTRACT

A method for providing a substrate coated with a cured damping coating including: applying a curable liquid damping composition to a substrate, wherein said curable liquid damping composition includes an admixture of certain Michael acceptor(s), certain Michael donor(s), a base catalyst; a rheology modifier; and a solid filler; wherein the filler is a different material than the rheology modifier; wherein the curable damping composition has a PVC of from 20% to 70%; and drying/curing the applied curable damping composition at a temperature of from 0° C. to 250° C. is provided. Also provided is a substrate coated with the cured damping coating.

5 Claims, No Drawings

METHOD FOR PROVIDING SUBSTRATE COATED WITH A CURED DAMPING COATING AND COATED SUBSTRATE SO PROVIDED

This invention relates to a method for providing a substrate coated with a cured damping coating, a substrate bearing a cured coating capable of damping sound and vibration. This invention particularly relates to a method for providing a substrate coated with a cured damping coating including: (a) applying a curable liquid damping composition to a substrate, wherein said curable liquid damping composition includes an admixture of: one or more oligomeric multifunctional (meth)acrylate Michael acceptors; one or more oligomeric multifunctional Michael donors selected from the group consisting of acetoacetate compounds, cyanoacetate compounds, acetoacetamide compounds, and cyanoacetamide compounds; from 0.001 to 1.0 moles of a base catalyst per equivalent of the multifunctional Michael donor(s); from 0.1% to 10% rheology modifier by wt, based on the wt. of the liquid damping composition; and a solid filler; wherein the filler is a different material than the rheology modifier; wherein the ratio of equivalents of said one or more multifunctional Michael acceptor(s) to equivalents of said one or more multifunctional Michael donor(s) is from 0.3 to 3.0; and wherein the curable damping composition has a pigment volume concentration (PVC) of from 20% to 70%; and (b) drying/curing the applied curable damping composition at a temperature of from 0° C. to 250° C. Also the invention relates to the cured coated substrate so provided.

The present invention serves to provide a method for providing a substrate coated with the damping composition and the cured coated substrate so formed, the dry, cured coating preferably having substantially improved water resistance relative to emulsion polymer-based coatings not of the present invention, good appearance properties, and, particularly, superior damping characteristics.

U.S. Pat. No. 8,389,630 discloses a curable composition containing a vinyl-based polymer having one or more crosslinkable functional groups at a terminus on average, preferably produced by controlled radical polymerization, and a nucleophilic agent, preferably an amine compound and/or a thiol compound. Cure disclosed to be via a Michael reaction proceeded in the presence of a catalyst and an optional epoxy resin.

However, coated substrates having superior water resistance and sound and vibration damping performance are still needed. A method for providing such a coated substrate using a curable liquid damping composition, having improved water resistance, good appearance properties and, particularly, surprisingly superior damping performance relative to that provided by comparable waterborne or solvent-borne coatings when dried and or cured has been provided. The curable liquid damping composition of the present invention also provides minimal environmental and safety concerns.

In a first aspect of the present invention there is provided a method for providing a substrate coated with a cured damping coating comprising: (a) applying a curable liquid damping composition to a substrate, wherein said curable liquid damping composition comprises an admixture of: one or more oligomeric multifunctional (meth)acrylate Michael acceptors; one or more oligomeric multifunctional Michael donors selected from the group consisting of acetoacetate compounds, cyanoacetate compounds, acetoacetamide compounds, and cyanoacetamide compounds; from 0.001 to 1.0 moles of a base catalyst per equivalent of said one or more multifunctional Michael donor(s); from 0.1% to 10% rheology modifier by wt. based on the wt. of said liquid damping composition; and a solid filler; wherein the ratio of the equivalents of said oligomeric multifunctional Michael acceptor(s) to the equivalents of said oligomeric multifunctional Michael donor(s) is from 0.3 to 3.0; and wherein said curable damping composition has a PVC of from 20% to 70%; and (b) drying/curing said applied curable damping composition at a temperature of from 0° C. to 250° C.

In a second aspect of the present invention there is provided a substrate coated with the cured damping coating of the first aspect of the present invention.

In the method of the present invention a curable liquid damping composition is formed. The curable liquid damping composition is an admixture of: an oligomeric multifunctional (meth)acrylate Michael acceptor; an oligomeric multifunctional Michael donor selected from the group consisting of acetoacetate compounds, cyanoacetate compounds, acetoacetamide compounds, and cyanoacetamide compounds; from 0.001 to 1.0 moles of a base catalyst per equivalent of multifunctional Michael donor; a rheology modifier; and a solid filler; wherein the ratio of equivalents of multifunctional Michael acceptor to equivalents of multifunctional Michael donor is from 0.3 to 3.0 and wherein the curable liquid damping composition has a PVC of from 20% to 70%.

As used herein, the use of the term "(meth)" followed by another term such as acrylate refers to both acrylates and methacrylates. For example, the term "(meth)acrylate" refers to either acrylate or methacrylate. Similarly, the term "(meth)acrylic acid" refers to methacrylic acid or acrylic acid.

By a "curable" composition herein is meant that the extent of reaction of either the oligomeric multifunctional (meth)acrylate Michael acceptor(s) or the oligomeric multifunctional Michael donor(s) is greater than 10%, preferably greater than 25%, on a equivalents basis when the curable composition has been subject to the curing temperature for a time sufficient to effect that extent of reaction, thus providing a "cured" composition.

By "liquid" composition herein is meant that the composition has an initial viscosity of between 10,000 mPa*s, at 25° C. to 2,000,000 mPa*s, at 25° C. as measured by ASTM D445-17a.

By "damping" composition herein is meant that the cured composition provides vibrational damping performance when measured by the method disclosed in "Test Methods" herein.

By "oligomer" herein is meant a compound having a Mn of from 200 to 10,000 as measured by gel permeation chromatography using polystyrene standards.

By "multifunctional" herein is meant a number of functional units of 2 or greater, preferably of greater than 2.5.

The Michael addition reaction is based on the addition of a nucleophile, referred to as a Michael donor, to an electrophile, referred to as a Michael acceptor.

The curable liquid damping composition includes one or more oligomeric multifunctional (meth)acrylate Michael acceptors. The oligomeric multifunctional (meth)acrylate Michael acceptor herein may be a blend of oligomeric multifunctional (meth)acrylate Michael acceptors varying, independently, in composition, molecular weight, or the number of equivalents of Michael acceptor per molecule. The multifunctional (meth)acrylate Michael acceptor may be, for example, bisphenol A epoxy diacrylate, bisphenol A glycerolate diacrylate, 1,4-butanediol diacrylate, 1,6- hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, trimethylolpropanetriacrylate, acrylated polyester oligomer, bisphenol A diacrylate, acrylated bisphenol A diglycidylether, ethoxylated bisphenol A diacrylate, tris(2-hydroxyethyl)isocyanurate triacrylate, (meth)acrylated aliphatic urethane oligomer, (meth)acrylated aromatic urethane oligomer, (meth)acrylated polyester, ethoxylated bisphenol A dimethacrylate, cyclohexane dimethanol dimethacrylate, 1,12 dodecane dimethacrylate, 1,3 butylene glycol dimethacrylate, polyethylene glycol dimethacrylate, triethylene glycol dimethacrylate, dipropylene glycol dimethacrylate, tripropylene glycol dimethacrylate, trimethylolpropane trimethacrylate, and mixtures thereof.

The curable liquid damping composition includes one or more oligomeric multifunctional Michael donors selected from the group consisting of acetoacetate compounds, cyanoacetate compounds, acetoacetamide compounds, and cyanoacetamide compounds. The Michael donor may be an ester of a mono-, di-, tri-, or poly-hydroxyl compound; typical Michael donors, for example, include methyl acetoacetate, t-butyl acetoacetate, butanediol acetoacetate, propyleneglycol diacetoacetate, pentaerythritol tri acetoacetate, cyanoacetate-functional butadiene oligomer, and the like.

The ratio of the equivalents of oligomeric multifunctional Michael acceptor(s) to equivalents of oligomeric multifunctional Michael donor(s) in the curable liquid damping composition is from 0.3 to 3.0, preferably from 0.75 to 1.25.

The curable liquid damping composition includes from 0.001 to 1.0 moles of a base catalyst per equivalent of multifunctional Michael donor(s); the base catalyst is usually characterized as a strong base catalyst, a catalyst in the present context that is effective in catalyzing the Michael reaction between the Michael acceptor and the Michael donor of the present invention. Such catalysts include tertiary amine compounds, quaternary ammonium hydroxides, alkali metal alkoxides, and the like. Typical catalysts include, for example, 1,1,3,3-tetramethylguanidine, tetramethylammonium hydroxide, and sodium phenoxide.

The curable damping composition includes a rheology modifier in an amount of from 0.1% to 10%, by weight, based on the weight of the curable damping composition. The amount of rheology modifier is selected to facilitate the application of the damping composition by the method of choice. Typically, the amount of rheology modifier is selected to provide an initial viscosity of from 10,000 mPa*s. at 25° C. to 2,000,000 mPa*s. at 25° C. as measured by ASTM D445. Typical rheology modifiers are bentonite clays, polyamides, and nanoparticles, i.e., particles having an average diameter of less than 100 nm, such as, for example, carbon black, fumed silica, or TiO2. Rheology modifiers can also include any typical rheology modifiers used in coating compositions, including polymeric rheology modifiers. In certain embodiments, particularly in relatively higher PVC compositions, organic solvents may optionally be incorporated into the damping composition; such solvents include organic solvents such as, for example, toluene, glycol ethers, and alcohols. Volume solids percentage (defined as the 1−(volume % of solvent/volume of all components)*100 is preferably >60%, more preferably >80%, and most preferably 100%.

The curable damping composition includes solid particulate filler in an amount such that the curable liquid damping composition has a pigment volume concentration ("PVC") of from 20% to 70%, preferably of from 45% to 65%. Typical particulate fillers include organic particles such as polymer particles, for example, polystyrene and polyvinyl chloride beads, expandable polymeric microspheres, synthetic or natural fibers, graphite, and microsphere pigments containing voids or vesicles such as, for example, ROPAQUE™ opaque polymers. Typical particulate fillers also include inorganic particles such as TiO2, SiO2, CaCO3, BaSO4, carbon black, and the like. Acid functionalized fillers should be avoided to prevent catalyst inactivation.

The pigment volume concentration is calculated by the following formula:

$$\text{PVC (\%)} = 100 \times [\text{dry volume filler(s)}]/[\text{dry volume filler(s)} + \text{dry volume binder(s)}]$$

The curable liquid damping composition is prepared by techniques that are well known in the coatings art. Typically the curable liquid damping composition is prepared as a one-pack (single component) or a two-pack (two component) composition. In a one-pack embodiment all of the ingredients are typically mixed together prior to application to a substrate. If the admixture has a relatively long pot life, application to a substrate may not need to be immediate; in a further variation, one of the ingredients such as the catalyst may be activated just before, during, or after application to a substrate by, for example, heat, light, or evaporation of a blocking entity. In a two-pack embodiment two previously prepared components are admixed to form the curable damping composition. For example, a first component including the Michael acceptor, filler, and rheology modifier is formed; a second component including the Michael donor, filler, rheology modifier and catalyst are formed; and then the two components are admixed immediately before application to the substrate. In an alternative two-pack embodiment, the first component may contain the catalyst instead of the second component. In a further two-pack embodiment only one of the components includes filler or rheology modifier. In a further two-pack embodiment a component not including catalyst may include Michael acceptor and some or all of the Michael donor, or the converse. It is contemplated that such mixing of the two components of a two-pack embodiment may occur, for example, in an appropriate vessel fitted with a mixing device or in a spray gun adapted to mixing two components during application. Optional ingredients may include, independently, defoamers, surfactants, dispersants, biocides, UV-absorbers, and other coatings adjuvants.

The curable liquid damping composition is typically applied to a substrate such as, for example, metal, plastics, previously painted or primed surfaces, and weathered surfaces. Application to vehicular components is particularly contemplated. The curable damping composition may be applied to a substrate using conventional coatings application methods such as, for example, air-atomized spray, air-assisted spray, airless spray, high volume-low pressure spray, and air-assisted airless spray. The curable liquid damping composition is typically applied as a single coating having a dried/cured thickness of from 1 mm to 10 mm, preferably of from 2 mm to 6 mm Preferred is application of the curable liquid damping composition as a single coating having a dried/cured thickness of from 2 to 5 times the thickness of the substrate, most preferred from 4 to 5 times the thickness of the substrate Drying, should the partial or substantially total removal of any volatile components, if present, be desired, and, particularly, curing of the curable damping composition may be effected, typically in a single operation, for example, at from 0° C. to 250° C., preferably at from 20° C. to 200° C., more preferably at from 100° C. to 200° C. for a time sufficient to achieve a cured state as defined herein. The damping performance occurs as a function of temperature, with a distribution around a central peak, referred to herein as the "peak damping performance temperature," which is the temperature at which the peak CLF (as defined in the test methods below) is measured. The CLF is measured over a useful temperature range for a given application. For automotive applications, a reasonable range for the peak damping performance temperature is from −5 to 60° C., preferably from 10 to 40° C. The peak damping performance temperature can be controlled by controlling the glass transition temperature of the polymer system used in the coating. The glass transition temperature of the polymer system is typically about 20° C. below the peak damping performance temperature, and can be measured by Differential Scanning calorimetry (DSC), scanning from a temperature of −90° C. to 150° C. at a heating rate of 10° C./min.

The following non-limiting examples are presented to illustrate the invention.

Test Methods:

Water Uptake of Cured Coatings:

Water uptake was evaluated by drawing down 2 mm wet thickness of coating sample onto aluminum panels. The samples were allowed to cure (12 hours (Example 1 and Comparative Examples A and B) or 168 hours (Example 2 and Comparative Examples C-E) and tested as is, or placed in an oven at 150° C. for 30 minutes. Samples were cooled and completely submerged in tap water for 48 hours. For testing at pH=4 (taken as representative of the pH of acid rain), samples were submerged in a 0.1 Molar acetic acid (82%) and 0.1 molar sodium acetate (18%) buffer solution. Water uptake was reported as a percent of coating mass after 24 and 48 hours of submersion. Samples were tested in triplicate.

Vibrational Damping

Composite Loss Factor (CLF) is a measure of vibrational damping. CLF was evaluated by forming a coating on 1.6 mm thick×12.7 mm width×200 mm length hardened carbon steel Oberst bars, following ASTM e-757. CLF data were reported for a frequency interpolation of 200 Hz over a useful temperature range for a given application. For automotive applications, a reasonable range for the peak damping performance temperature is from −5 to 60° C., preferably from 10 to 40° C. Coating coverage and thickness were reported in the data table as CLF is dependent on coverage.

$$CLF \cong A \times \left(\frac{E'_{Coating}}{E'_{Substrate}}\right) \times \left(\frac{h_{Coating}}{h_{Substrate}}\right)^2 \times (\tan\delta_{Coating})$$

Where:
CLF: Composite Loss Factor (unitless)
A: Constant (unitless)
$E'_{Coating}$: Storage Modulus of the Viscoelastic Layer (MPa)
E' Substrate: Storage Modulus of the Substrate (MPa)
$h_{Coating}$: Thickness of the Viscoelastic Layer (mm)
$h_{substrate}$: Thickness of the Substrate (mm)
Tan $\delta_{Coating}$: Tan Delta of the Viscoelastic Layer (unitless)

Materials used in the examples:
Michael acceptors:
Ethoxylated (4) bisphenol A diacrylate, (SR601, available from Sartomer)
Ethoxylated (10) bisphenol A diacrylate, (SR602, available from Sartomer) Pentaerythritol
Triacrylate (SR444, available from Sartomer)
Catalyst: 1,1,3,3-tetramethylguanidine (TMG, available from Sigma-Aldrich) Michael
donor: Methyl acetoacetate (MeAcAc, available from Sigma Aldrich)

EXAMPLE 1. FORMATION OF CURABLE DAMPING COMPOSITION

The composition was prepared in two components as follows. Component 1A: Michael acceptor: 5.75 g SR601, 5.75 g SR602, 0.5 g SR444; 25 g toluene (Sigma-Aldrich); and 54.4 g CaCO3 (filler; TITAN™-200) were added to a container and mixed using an air powered mixer with a Teflon 3-paddle blade for 10 minutes. 0.1 g TMG catalyst was added, and again mixed for 10 minutes. Finally, 3 g CLAYTONE™ AF (BYK) rheology modifier was added and again mixed for 10 minutes. Component 1B: Michael donor: 2.46 g MeAcAc; 4 g toluene; and 10 g CaCO3 (TITAN™-200) were added to a container and mixed using an air powered mixer with a Teflon 3-paddle blade for 10 minutes. The two components were blended together and fully mixed with the air-powered mixer before use. The baked sample was baked at 150 C for 30 minutes prior to testing.

COMPARATIVE EXAMPLE A. FORMATION OF COMPARATIVE DAMPING COMPOSITION 100 g of PARALOID™ B-72 (Acrylic thermoplastic resin with Tg of 40° C. and weight average molecular weight of 105K, 50% in toluene) and 9.6 g toluene were added to a glass bottle and mixed using an air powered mixer with a Teflon 3-paddle blade. 225 g TITAN™-200 filler was slowly added under mixing, and mixed for 15 minutes. The coating was thickened with 2.5 g of CLAYTONE™ AF (BYK) rheology modifier and mixed for an additional 15 minutes. The composition was then heated in an oven at 150° C. for 30 minutes prior to testing.

COMPARATIVE EXAMPLE B. FORMATION OF COMPARATIVE DAMPING COMPOSITION 80 g acrylic latex (with Tg of 0° C., 50% solids in water), 0.5 g BYK-093, 0.32 g BAYFERROX™ 318M, 125 g TITAN™-200 (Omya), 0.3 g EXPANCEL™ 031WUFX40, and 4 g KOLLOTEX™ 1500 (AVEBE GmbH) were mixed together for 15 minutes using a standard overheard mixer. 0.4 g of ACRYSOL™ RM12-W was added under further mixing. Coating is formed then heated in oven at 150° C. for 30 minutes prior to testing.

EXAMPLE 2. FORMATION OF CURABLE DAMPING COMPOSITION

The composition was prepared in two components as follows. Component A: Michael acceptor, 5.75 g SR601, 5.75 g SR602, 0.5 g SR444, and 24 g CaCO3 (TITAN™-200) were added to a container and mixed using an air powered mixer with a Teflon 3-paddle blade for 10 minutes. 0.1 g TMG was added, and again mixed for 10 minutes. Finally, 2 g CLAYTONE™ AF was added and again mixed for 10 minutes. Component B: Michael donor, 2.46 g MeAcAc, and 7 g CaCO3 (TITAN™-200) were added to a container and mixed using an air powered mixer with a Teflon 3-paddle blade for 10 minutes. The two components were blended together and fully mixed with the air-powered mixer before use.

COMPARATIVE EXAMPLE C. FORMATION OF COMPARATIVE DAMPING COMPOSITION

The composition was prepared in two components as follows. Component 1: Michael acceptors, 5.75 g SR601, 5.75 g SR602, 0.5 g SR444, and 27 g CaCO3 (TITAN™-200) were added to a container and mixed using an air powered mixer with a Teflon 3-paddle blade for 10 minutes. 2 g CLAYTONE™ AF was added and again mixed for 10 minutes. Component 2: Michael donor, 1.296 g triethylene tetramine, and 3 g CaCO3 (TITAN™-200) were added to a container and mixed using an air powered mixer with a Teflon 3-paddle blade for 10 minutes. The two components (1:1 acceptor:donor) were blended together and fully mixed with the air-powered mixer before use.

COMPARATIVE EXAMPLE D. FORMATION OF COMPARATIVE DAMPING COMPOSITION

The composition was prepared in two components as follows. Component 1: Michael acceptors, 5.75 g SR601, 5.75 g SR602, 0.5 g SR444, and 27 g CaCO3 (TITAN™-200) filler were added to a container and mixed using an air powered mixer with a Teflon 3-paddle blade for 10 minutes. 4 g CLAYTONE™ AF was added and again mixed for 10 minutes. Component 2: Michael donor, 6.178 g triethylene tetramine, and 15 g CaCO3 (TITAN™-200) were added to a container and mixed using an air powered mixer with a Teflon 3-paddle blade for 10 minutes. The two components (1:6 acceptor:donor) were blended together and fully mixed with the air-powered mixer before use.

COMPARATIVE EXAMPLE E. FORMATION OF COMPARATIVE DAMPING COMPOSITION

The composition was prepared in two components as follows. Component 1: Michael acceptors, 5.75 g SR601, 5.75 g SR602, 0.5 g SR444, and 27 g CaCO3 (TITAN™-200) were added to a container and mixed using an air powered mixer with a Teflon 3-paddle blade for 10 minutes. 4 g CLAYTONE™ AF (BYK) was added and again mixed for 10 minutes. Component 2: Michael donor, 5.169 g Pentaerythritol tetrakis(3-mercaptopropionate), 0.2 g triethylenetetramine and 12 g CaCO3 (TITAN™-200) were added to a container and mixed using an air powered mixer with a Teflon 3-paddle blade for 10 minutes. The two components (1:1 acceptor:donor) were blended together and fully mixed with the air-powered mixer before use.

Note: PARALOID™ and ACRYSOL™ are trademarks of The Dow Chemical Company. TITAN™ is a trademark of Omya Inc. BAYFERROX™ is a trademark of Lanxess AG. EXPANCEL™ is a trademark of AkzoNobel N.V. KOLLOTEX™ is a trademark of Avebe GmbH. CLAYTONE™ is a trademark of (BYK) Altana Group AG.

EXAMPLE 3. EVALUATION OF APPLIED DRIED/CURED DAMPING COATINGS

TABLE 3.1

Water pickup and CLF performance

| Sample | PVC | WPU 24 hr (mass %) | WPU 48 hr (mass %) | CLF Peak Height | CLF Peak Temp (° C.) | Avg coverage (kg/m$^2$) | Avg thickness (mm) | CLF Area |
|---|---|---|---|---|---|---|---|---|
| Ex. 1 | 65 | 0.80% | 1.16% | 0.45 | 11.3 | 4.9 | 3.2 | 7.2 |
| Comp. Ex. A | 65 | 0.78% | 1.33% | 0.17 | 64.3 | 4.1 | 3.5 | 5.3 |
| Comp. Ex. B | 65 | 35% | 54% | 0.23 | 25.2 | 4.6 | 5.2 | 8.6 |

Note:
The appearance of the Example 1 coating after the water pickup test was excellent, i.e., the surface remained smooth and hard.

Example 1 of the present invention provided superior or exceptional water uptake and surprisingly superior vibration damping performance (CLF height) relative to Comparative Examples A and B, representing technologies not of the present invention.

EXAMPLE 4. EVALUATION OF APPLIED DRIED/CURED DAMPING COATINGS

TABLE 4.1

Water pickup performance

| Sample | PVC | WPU 24 hr (mass %) | WPU 48 hr (mass %) | WPU pH = 4 24 hr (mass %) | WPU pH = 4 48 hr (mass %) |
|---|---|---|---|---|---|
| Ex. 2 | 50 | 0.43% | 0.88% | 0.56% | 1.2% |
| Comp. Ex. C | 50 | 2.1% | 2.9% | 3.3% | 4.9% (softens) |
| Comp. Ex. D | 50 | Coating fell apart upon immersion in water | | | |
| Comp. Ex. E | 50 | 2.5% | 5.3% | 5.1% (softens) | 7.4% (softens) |

Example 2 of the present invention provided exceptional water uptake relative to Comparative Examples C-E, not of the present invention

What is claimed is:

1. A method for providing a substrate coated with a cured damping coating comprising:
    (a) applying a curable liquid damping composition to a substrate, wherein said curable liquid damping composition comprises an admixture of:
    one or more oligomeric multifunctional (meth)acrylate Michael acceptors;
    one or more oligomeric multifunctional Michael donors selected from the group consisting of acetoacetate compounds, cyanoacetate compounds, acetoacetamide compounds, and cyanoacetamide compounds;
    from 0.001 to 1.0 moles of a base catalyst per equivalent of multifunctional Michael donor(s);
    from 0.1% to 10% rheology modifier by wt. based on the wt. of said liquid damping composition;
    and a solid filler;
    wherein the filler is a different material than the rheology modifier; wherein the ratio of the equivalents of said one or more oligomeric multifunctional Michael acceptor(s) to the equivalents of said one or more oligomeric multifunctional Michael donor(s) is from 0.3 to 3.0; and wherein said curable damping composition has a pigment volume concentration of from 20% to 70%; and
    (b) drying/curing said applied curable damping composition at a temperature of from 0° C. to 250° C. to provide said substrate coated with said cured damping coating.

2. The method of claim 1 wherein said curable liquid damping composition has a pigment volume concentration of from 45% to 65%.

3. The method of claim 1 wherein the ratio of the equivalents of said one or more oligomeric multifunctional Michael acceptor(s) to the equivalents of said one or more oligomeric multifunctional Michael donor(s) is from 0.75 to 1.25.

4. A substrate coated with said cured damping coating formed by the method of claim 1.

5. The coated substrate of claim 4 wherein said cured damping coating is a single coat having a dried/cured thickness of from 2 mm to 6 mm.

* * * * *